United States Patent [19]

Manser et al.

[11] Patent Number: 4,920,182

[45] Date of Patent: Apr. 24, 1990

[54] EPOXY RESIN COMPOSITIONS CONTAINING POLYESTER FLEXIBILIZER AND METALLOCENE COMPLEX INITIATOR

[75] Inventors: Aloysius H. Manser, Allschwil, Switzerland; Dieter Strasilla, Weil am Rhein, Fed. Rep. of Germany; Rolf Mülhaupt, Marly, Switzerland

[73] Assignee: Ciba-Geigy Corporation, Ardsley, N.Y.

[21] Appl. No.: 279,884

[22] Filed: Dec. 5, 1988

[30] Foreign Application Priority Data

Dec. 18, 1987 [CH] Switzerland ............... 4957/87

[51] Int. Cl.$^5$ ............................................. C08L 63/02
[52] U.S. Cl. ................................. 525/438; 525/507; 525/508; 525/533
[58] Field of Search ............... 525/438, 507, 508, 533

[56] References Cited

U.S. PATENT DOCUMENTS 4,604,308 8/1986 Widmer et al. ............... 525/438

FOREIGN PATENT DOCUMENTS 0056356 7/1982 European Pat. Off. ............ 525/438
0094915 11/1983 European Pat. Off. .
0126712 11/1984 European Pat. Off. .
0152377 8/1985 European Pat. Off. .
0194904 9/1986 European Pat. Off. ............ 525/438
2126478 12/1971 Fed. Rep. of Germany ...... 525/438
54-118436 9/1979 Japan ................................. 525/438

*Primary Examiner*—John C. Bleutge
*Assistant Examiner*—Robert E. L. Sellers, II
*Attorney, Agent, or Firm*—Stephen V. O'Brien

[57] ABSTRACT

Compositions are described containing
(A) an epoxy resin having on average at least two 1,2-epoxy groups per molecule or a mixture of these epoxy resins,
(B) a compound of the formula I or a mixture of these compounds $$[R^1(Fe^{II}R^2)_a]^{\oplus ab} \text{ab} \cdot [X]^{\ominus} \qquad (I)$$

in which a and b independently of one another are 1 or 2, $R^1$ is a $\pi$-arene, $R^2$ is a $\pi$-arene, an indenyl anion or a cyclopentadienyl anion, $X^\ominus$ is an $[LQ_m]^\ominus$ or an anion of a partially fluorinated or perfluorinated aliphatic or aromatic sulfonic acid, L is B, P, As or Sb, Q is fluorine or some of the radicals Q can also be hydroxyl groups and m corresponds to the valence of L increased by one, and
(C) a flexible polyester which is terminated by, on average, at least two carboxyl groups and which is derived from an aliphatic or cycloaliphatic polyol or a mixture of such polyols and from an aliphatic, cycloaliphatic or aromatic polycarboxylic acid or a mixture of such polycarboxylic acids.

The compositions can be employed as coating agents or as adhesives.

8 Claims, No Drawings

EPOXY RESIN COMPOSITIONS CONTAINING POLYESTER FLEXIBILIZER AND METALLOCENE COMPLEX INITIATOR

The present invention relates to novel epoxy resin compositions, to the cured products and to the use of the epoxy resin compositions as adhesives or as coating agents.

In general, cured epoxy resins are brittle materials which have low roller-peel strengths and impact strengths. In order to counteract this embrittlement, flexibilizers are added to the epoxy resin. Examples of these are elastic prepolymers, such as adducts of epoxy resins with carboxyl-terminated or amino-terminated butadiene/acrylonitrile copolymers or carboxyl-terminated polyesters. These additives can lead to an impairment in other desirable properties, for example to a reduction of the tensile shear strength of the cured formulation. Mixtures of epoxy resins and metallocene complex salts are known from EP-A 94,915. The mixtures can be activated by irradiation and can be cured in a thermal stage. Combinations of epoxy resins, selected iron arene complex salts and selected flexibilizers have now been found, from which one-component adhesives can be prepared. The cured adhesive compounds from these mixtures are distinguished by a high tensile shear strength and a high roller-peel strength. Selected one-component adhesives can be cured at as low as 80°–100° C., or lower, and can be employed, for example, as structural adhesives.

The present invention relates to compositions containing (A) an epoxy resin having on average at least two 1,2-epoxy groups per molecule or a mixture of these epoxy resins, (B) a compound of the formula I or a mixture of these compounds

$$[R^1(Fe^{II}R^2)_a]^{ab} \oplus_{ab} \cdot [X]^\ominus \qquad (I)$$

in which a and b independently of one another are 1 or 2, $R^1$ is a $\pi$-arene, $R^2$ is a $\pi$-arene, an indenyl anion or a cyclopentadienyl anion, $X^\ominus$ is an $[LQ_m]^\ominus$ or an anion of a partially fluorinated or perfluorinated aliphatic or aromatic sulfonic acid, L is B, P, As or Sb, Q is fluorine or some of the radicals Q can also be hydroxyl groups and m corresponds to the valence of L increased by one, and (C) a flexible polyester which is terminated by, on average, at least two carboxyl groups and which is derived from an aliphatic or cycloaliphatic polyol or a mixture of such polyols and from an aliphatic, cycloaliphatic or aromatic polycarboxylic acid or a mixture of such polycarboxylic acids.

Any epoxy resins having on average at least two 1,2-epoxy grops in the molecule are, as a rule, suitable as the component (A). These compounds include, for example, the following:

(I) Polyglycidyl and poly-($\beta$-methylglycidyl) esters obtainable by reacting a compound having at least two carboxyl groups in its molecule and epichlorohydrin or glycerol dichlorohydrin or $\beta$-methylepichlorohydrin. The reaction is advantageously carried out in the presence of bases.

Aliphatic, cycloaliphatic or aromatic polycarboxylic acids can be used as the compound having at least two carboxyl groups in its molecule. Examples of these polycarboxylic acids are listed later in the test as formation components of the polyester (C).

(II) Polyglycidyl or poly-($\beta$-methylglycidyl) ethers obtainable by reacting a compound having at least two free alcoholic hydroxyl groups and/or phenolic hydroxyl groups and a suitably substituted epichlorohydrin under alkaline conditions or in the presence of an acid catalyst with subsequent treatment with alkali.

Ethers of this type are derived, for example, from acyclic alcohols, such as ethylene glycol, diethylene glycol and higher poly-(oxyethylene) glycols, propane-1,2-diol or poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol, sorbitol and polyepichlorohydrins.

They are, however, also derived, for example, from cycloaliphatic alcohols, such as 1,3-dihydroxycyclohexane, 1,4-dihydroxycyclohexane, bis-(4-hydroxycyclohexyl)-methane, 2,2-bis-(4-hydroxycyclohexyl)-propane or 1,1-bis-(hydroxymethyl)-cyclohex-3-ene.

The epoxy compounds can also be derived from mononuclear phenols, for example from resorcinol or hydroquinone; or they are based on polynuclear phenols, for example on bis-(4-hydroxyphenyl)-methane, 4,4'-dihydroxybiphenyl, bis-(4-hydroxyphenyl) sulfone, 1,1,2,2-tetrakis-(4-hydroxyphenyl)-ethane, 2,2-bis-(4-hydroxyphenyl)-propane or 2,2-bis-(3,5-dibromo-4-hydroxyphenyl)-propane, and on novolaks which can be obtained by the condensation of aldehydes, for example formaldehyde, acetaldehyde, chloral or furfuraldehyde, with phenols, such as phenol, or with phenols which are substituted on the ring by chlorine atoms or $C_1$–$C_9$alkyl groups, for example 4-chlorophenol, 2-methylphenol or 4-tert.butylphenol, or which can be obtained by condensation with bisphenols, as described above.

(III) Poly-(S-glycidyl) compounds, in particular di-S-glycidyl derivatives derived from dithiols, for example ethane-1,2-dithiol or bis-(4-mercaptomethylphenyl) ether.

(IV) Cycloaliphatic epoxy resins, such as bis-(2,3-epoxycyclopentyl) ether, 2,3-epoxycyclopentyl glycidyl ether or 1,2-bis-(2,3-epoxycyclopentyloxy)-ethane or 3,4-epoxycyclohexylmethyl 3',4'-epoxycyclohexanecarboxylate.

It is also possible, however, to use epoxy resins in which the 1,2-epoxy groups are attached to different heteroatoms or functional groups; these compounds include, for example, the glycidyl ether/glycidyl ester of salicylic acid.

If desired, it is possible to use a mixture of epoxy resins in the mixtures according to the invention.

These epoxy resins are known per se or can be prepared by known processes.

In the case of component (B), suitable $\pi$-arenes $R^1$ and $R^2$ are, in particular, carbocyclic aromatic hydrocarbons having 6 to 24 carbon atoms, in particular 6 to 12 carbon atoms, or heterocyclic aromatic hydrocarbons having 4 to 11 carbon atoms and one or two S and/or O atoms, it being possible for these groups to be monosubstituted or polysubstituted, preferably monosubstituted or disubstituted, if appropriate, by identical or different monovalent radicals, such as halogen atoms, preferably chlorine or bromine atoms, or $C_1$–$C_8$alkyl, $C_1$–$C_8$alkoxy or phenyl. These $\pi$-arene groups can be mononuclear, condensed polynuclear or non-condensed polynuclear systems, and, in the systems last mentioned, the nuclei can be attached to one another directly or via bridge members, such as —CH$_2$—, —C(CH$_3$)$_2$—, —O—, —S—, —SO$_2$—, —CO— or —CH=CH—.

R$^2$ can also be an indenyl anion and, in particular, a cyclopentadienyl anion, and it is also possible for these anions to be monosubstituted or polysubstituted, preferably monosubstituted or disubstituted, if appropriate, by identical or different monovalent radicals, such as have been mentioned above as substituents for $\pi$-arenes.

The alkyl or alkoxy substituents involved can be straight-chain or branched. Methyl, ethyl, n-propyl, isopropyl, n-butyl, sec-butyl, tert-butyl, n-pentyl, n-hexyl and n-octyl and methoxy, ethoxy, n-propoxy, isopropoxy, n-butoxy, n-hexyloxy and n-octyloxy may be mentioned as typical alkyl or alkoxy substituents. Of these, alkyl and alkoxy groups having 1 to 4, and especially 1 or 2, carbon atoms in the alkyl moieties are preferred. Preferred substituted $\pi$-arenes or substituted indenyl or cyclopentadienyl anions are those which contain one or two of the abovementioned substituents, in particular methyl, ethyl, n-propyl, isopropyl, methoxy or ethoxy groups.

Identical or different $\pi$-arenes can be present as R$^1$ and R$^2$.

Examples of suitable $\pi$-arenes are benzene, toluene, xylenes, ethylbenzene, cumene, methoxybenzene, ethoxybenzene, dimethoxybenzene, p-chlorotoluene, m-chlorotoluene, chlorobenzene, bromobenzene, dichlorobenzene, trimethylbenzene, trimethoxybenzene, naphthalene, 1,2-dihydronaphthalene, 1,2,3,4-tetrahydronaphthalene, methylnaphthalene, methoxynaphthalene, ethoxynaphthalene, chloronaphthalene, bromonaphthalene, biphenyl, stilbene, indene, 4,4'-dimethylbiphenyl, fluorene, phenanthrene, anthracene, 9,10-dihydroanthracene, triphenyl, pyrene, perylene, naphthacene, coronene, thiophene, chromene, xanthene, thioxanthene, benzofuran, benzothiophene, naphthothiophene, thianthrene, diphenylene oxide and diphenylene sulfide.

Examples of anions of substituted cyclopentadienes are the anions of methyl-, ethyl-, n-propyl- and n-butyl-cyclopentadiene or the anions of dimethylcyclopentadiene. Preferred anions are the anion of unsubstituted indene and, in particular, of unsubstituted cyclopentadiene.

The index a is preferably 1. The index b is preferably 1. If a is 2, each R$^2$ is preferably the substituted or unsubstituted indenyl anion or, in particular, the cyclopentadienyl anion.

X$^{\ominus}$ is preferably the anion of a perfluoroaliphatic or perfluoroaromatic sulfonic acid and is very particularly [LQ$_m$]$^{\ominus}$ as defined above.

Examples of anions of perfluoroaliphatic or perfluoroaromatic sulfonic acids are CF$_3$SO$_3^{\ominus}$, C$_2$F$_5$SO$_3^{\ominus}$, n—C$_3$F$_7$SO$_3^{\ominus}$, n—C$_4$F$_9$SO$_3^{\ominus}$, n—C$_6$F$_{13}$SO$_3^{\ominus}$, n—C$_8$F$_{17}$SO$_3^{\ominus}$, C$_6$F$_5$SO$_3^{\ominus}$ and CF$_3$C$_6$F$_4$SO$_3^{\ominus}$.

Examples of anions [LQ$_m$]$^{\ominus}$ which are particularly preferred are PF$_6^{\ominus}$, AsF$_6^{\ominus}$, SbF$_6^{\ominus}$ and SbF$_5$(OH)$^{\ominus}$. AsF$_6^{\ominus}$, SbF$_6^{\ominus}$ and SbF$_5$(OH)$^{\ominus}$ and especially SbF$_6^{\ominus}$ are very particularly preferred.

Curable mixtures containing initiators having these very particularly preferred anions can be cured even at low temperatures after they have been activated by irradiation.

The compounds of the formula I are known per se or can be prepared analogously to known compounds. The preparation of the salts in which X$^-$=[LQ$_m$]$^-$ is described, for example, in EP-A 94,915. Compounds of the formula I having other anions can be prepared modifying the process described therein, by introducing, in a manner known per se, another anion of the acid HX instead of an anion of a complex acid; X here is as defined above.

Component (C) can be solid or liquid at room temperature. As a rule, they are linear polyesters or compounds having a degree of branching or of crosslinking such that they can be dissolved in an organic solvent without a gel residue. The degree of branching or of crosslinking can be regulated in a manner known per se by the functionality and amount of polyfunctional condensation components (polyols or polycarboxylic acids).

The flexible polyesters (C) can be amorphous or partly crystalline and are preferably compatible with the resin component (A) or readily dispersible therein.

The softening point of the polyesters (C) is preferably below 100° C.

As a rule, the polyesters (C) have molecular weights (number average) of 250 to 15,000, preferably 500 to 2500.

Their acid number is, as a rule, 0.1 to 5 equivalents/kg, preferably 0.25 to 2.0 equivalents/kg.

The viscosity (Epprecht) of these polyesters is less than 2000 mPas (at 80° C.) as a rule.

The carboxyl-terminated, flexible polyesters are derived from aliphatic or cycloalipatic polyols and from aliphatic, cycloaliphatic or aromatic polycarboxylic acids. The preferred polyol is hexanediol, which can be combined with neopentyl glycol or cyclohexanedimethanol in order to increase the resistance to hydrolysis. The preferred polycarboxylic acids are $\alpha,\omega$-dicarboxylic acids having aliphatic segments, for example adipic or sebacic acid.

In the case of the polyols it is preferable to employ low-molecular-weight and prepolymeric synthesis components.

Prepolymeric synthesis components are understood, in general, to mean hydroxyl-terminated prepolymers having at least two recurring flexibilizing structural components. Examples of these are hydroxyl-terminated polyethers based on polypropylene glycol and polybutylene glycol and also hydroxyl-terminated polycaprolactones. The molecular weight (number average) of these prepolymers is generally 150–4000, preferably 500–2500.

Prepolymeric synthesis components can be difunctional or polyfunctional, preferably difunctional or trifunctional. Low-molecular-weight synthesis components are difunctional as a rule. Polyesters (C) can, however, contain small amounts of low-molecular-weight, polyfunctional synthesis components.

In all these embodiments the nature, functionality and amount of polyfunctional components should be so chosen that a soluble polyester having the specifications indicated above is formed.

Examples of aliphatic dicarboxylic acids are saturated aliphatic dicarboxylic acids, such as oxalic acid, malonc acid, succinic acid, $\alpha$-methylsuccinic acid, glutaric acid, adipic acid, pimelic acid, azelaic acid, sebacic acid or dimerized linoleic acid; or unsaturated aliphatic polycarboxylic acids, such as maleic acid, fumaric acid, mesaconic acid, citraconic acid, glutaconic acid or itaconic acid, and also possible anhydrides of these acids.

Examples of cycloaliphatic dicarboxylic acids are hexahydrophthalic, hexahydroisophthalic or hexahydroterephthalic acid, tetrahydrophthalic, tetrahydroisophthalic of tetrahydroterephthalic acid or 4-methyltetrahydrophthalic acid, 4-methylhexahydrophthalic acid or endomethylenetetrahydrophthalic acid.

Examples of aromatic dicarboxylic acids are phthalic, isophthalic and terephthalic acid.

Examples of polyfunctional carboxylic acids are aromatic tricarboxylic or tetracarboxylic acids, such as trimellitic acid, trimesic acid, pyromellitic acid or benzophenonetetracarboxylic acid; or trimerized fatty acids or mixtures of dimerized and trimerized fatty acids, such as are available commercially, for example under the name Pripol ®.

Examples of low-molecular-weight aliphatic diols are α,ω-alkylenediols, such as ethylene glycol, propane-1,2-diol, propane-1,3-diol, butane-1,4-diol, pentane-1,5-diol, neopentyl glycol, hexane-1,6-diol, octane-1,8-diol, decane-1,10-diol or dodecane-1,12-diol.

Examples of low-molecular-weight cycloaliphatic diols are 1,3-dihydroxycyclohexane, 1,4-dihydroxycyclohexane, 1,4-cyclohexanedimethanol, bis-(4-hydroxycyclohexyl)-methane or 2,2-bis-(4-hydroxycyclohexyl)-propane.

Examples of low-molecular-weight polyfunctional alcohols are 1,1,1-trimethylolethane, 1,1,1-trimethylolpropane, glycerol or pentaerythritol.

Examples of suitable hydroxyl-terminated prepolymers having at least two recurring flexibilizing structural units are polyethers, polyesters or polythioethers, provided these compounds are hydroxyl-terminated.

These compounds are known per se to those skilled in the art. They can be linear or branched; the linear types are preferred.

Examples of hydroxyl-terminated polyethers are polyalkylene ether polyols which are obtained by ionic polymerization, copolymerization or block copolymerization of alkylene oxides, such as ethylene oxide, propylene oxide or butylene oxide, in the presence or absence of difunctional or polyfunctional alcohols, such as butane-1,4-diol, 1,1,1-trimethylolethane, 1,1,1-trimethylolpropane, hexane-1,2,6-triol, glycerol, pentaerythritol or sorbitol, or in the presence of amines, such as methylamine, ethylenediamine or hexane-1,6-diamine, or by ionic polymerization or copolymerization of cyclic ethers, such as tetrahydrofuran, ethylene oxide or propylene oxide, by means of acid catalysts, such as $BF_3$·etherate, or by polycondensation of glycols which can be polycondensed with the elimination of water, such as hexane-1,6-diol, in the presence of acid etherification catalysts, such as p-toluenesulfonic acid. It is also possible to use alkoxylation products of phosphoric acid or phosphorous acid with ethylene oxide, propylene oxide or butylene oxide.

Examples of hydroxyl-terminated polyester-polyols are compounds derived from dicarboxylic and/or polycarboxylic acids and diols and/or polyols, preferably from dicarboxylic acids and diols. Examples of suitable polyols and polycarboxylic acids have been enumerated earlier in the text as synthesis components for the polyesters (C).

Further examples of suitable hydroxyl-terminated prepolymers are polymerization products of lactones, for example of ε-caprolactones; or polyalkylene thioether polyols, for example the polycondensation products of thiodiglycol with itself and with diols and/or polyols, for example hexane-1,6-diol, triethylene glycol, 2,2-dimethyl-1,3-propanediol or 1,1,1-trimethylolpropane.

The preparation of the polyesters (C) is effected in a manner known per se by reacting the polyol component(s) with an excess of polycarboxylic acid component(s). It is also possible to employ a polyester-forming derivative, for example an anhydride, instead of the polycarboxylic acid.

In another mode of preparation, the polyol and polycarboxylic acid (derivative) are subjected to a condensation reaction, the polyol being employed in excess. The resulting prepolymer having hydroxyl groups is then masked with carboxylic anhydrides to give the carboxyl-terminated polyester.

It is also possible to use as starting materials the other hydroxyl-terminated prepolymers described earlier in the text and to mask these with suitable carboxylic anhydrides.

The polyester resins can be prepared by general procedures which are used in the preparation of resins of this type. Thus the esterification can be carried out advantageously by a melt condensation of the carboxylic acid component(s) and the diol. In this case the reactants are, for example, heated with stirring to temperatures of up to 250° C. It can be advantageous to pass an inert gas, for example nitrogen, through the reaction mixture, in order to remove the water formed during the esterification reaction. It is also possible, if desired, to apply a slight vacuum at the end of the esterification reaction, in order to isolate residual low-molecular-weight cleavage products. The preferred temperature range in the melt condensation is 160°–250° C. It is also possible, however, to use other types of polycondensation, for example interphase polycondensation or polycondensation in solution, in suspension or in bulk.

The condensation of polycarboxylic acids and/or polyols having degrees of functionality greater than two is carried out in a manner known per se to those skilled in the art, under conditions and using stoichiometric ratios such that gel formation is prevented and branching of the polyester is effected.

The polyester (C) can be a carboxyl-terminated prepolymer, or this adduct is present as a mixture with unreacted carboxylic acid or anhydride.

Preferred components (A) are polyglycidyl ethers based on phenols, very particularly the diglycidyl ethers of bisphenols.

These resins can be liquid or solid. For adhesives it is preferable to use combinations of liquid diglycidyl ethers based on bisphenol together with solid diglycidyl ethers based on bisphenol or with solid polyglycidyl ethers based on phenol-formaldehyde novolaks or cresol-formaldehyde novolaks. The combinations of liquid and solid bisphenol A diglycidyl ethers are particularly preferred.

Preferred components (B) are compounds of the formula I as defined above in which $R^1$ is a benzene or naphthalene radical which is monosubstituted or disubstituted by alkyl or alkoxy, $R^2$ is a cyclopentadienyl anion and $X^-$ is $SbF_6^{\ominus}$.

Preferred substituents in the benzene or naphthalene radical are $C_1$–$C_6$alkyl or $C_1$–$C_6$alkoxy radicals, especially methyl, ethyl, n-propyl or isopropyl or methoxy, ethoxy, n-propoxy or isopropoxy.

Preferred components (C) are compounds of the formula II

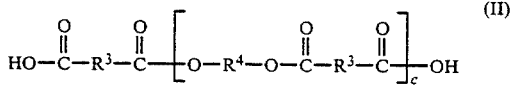

(II)

in which $R^3$ is a radical of an aliphatic, cycloaliphatic or aromatic dicarboxylic acid after the carboxyl groups have been removed, preferably a radical of an aliphatic dicarboxylic acid and especially a radical of fumaric acid or of maleic acid, $R^4$ is a radical of a dihydric, aliphatic or cycloaliphatic alcohol after the hydroxyl groups have been removed, and c is an integer from 1 to 50.

The index c is preferably 2 to 25.

Components (C) which are particularly preferred are compounds of the formula II in which at least some of the radicals $R^4$ are divalent radicals of a polyalkylene ether.

Radicals $R^4$ which are very particularly preferred include the groups of the formulae IIIa, IIIb and especially IIIc

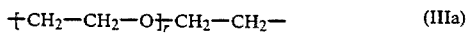

(IIIa)

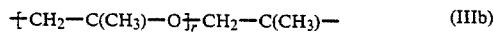

(IIIb)

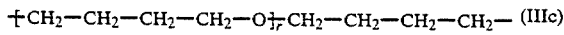

(IIIc)

in which r is an integer from 4 to 25.

The curable compositions can also contain other additives (D) which are known and are customarily employed in the technology of photopolymerizable materials or of adhesives. Examples of additives of this type are pigments, dyes, fillers and reinforcing agents, glass fibres and other fibres, flame-retardants, antistatic materials, flow control agents, antioxidants, adhesion promoters, plasticizers, wetting agents, thixotropic agents and light stabilizers.

The compositions according to the invention can also contain combinations of initiators of the formula I and sensitizers. Particularly in the case of compounds of the formula I in which $R^1$ is a substituted or unsubstituted benzene derivative, an increase in sensitivity to light is, as a rule, observed when sensitizers are added. Examples of suitable sensitizers are to be found in EP-A 152,377. Combinations of initiators of the formula I, oxidizing agents and, if appropriate, sensitizers for the compounds I can also be employed in the compositions according to the invention. As a rule, oxidizing agents lower the curing temperatures and permit processing under mild conditions. Suitable oxidizing agents are mentioned in EP-A 126,712.

The following quantity data relate in each case to the total amount of components (A), (B), (C) and (D).

The amount of component (A) is, as a rule, 40–95% by weight, in particular 50–90% by weight. The initiator (B) is present, as a rule, in amounts of 0.1–10% by weight, in particular 0.1 to 5% by weight. The proportion of component (C) is, as a rule, 5 to 50% by weight, particularly 5 to 30% and very particularly preferably 10 to 30% by weight, while the proportion of the additives (D) can amount to 0–50% by weight.

The curable compositions according to the invention are sensitive to light. They can be obtained in any desired form, for example as homogeneous liquid or solid mixtures. Solid products can be obtained in a manner known per se, for example by liquefying solid epoxy resins, if appropriate with the addition of suitable solvents, in the dark or under red light, heating the resins to temperatures above their glass transition point, adding the initiator (B) and the component (C), and homogenizing and cooling the resulting mixtures. If desired, the products obtained in this way can then be comminuted. In the case of liquid epoxy resins, the composition according to the invention can be obtained by merely mixing the components.

The curable compositions according to the invention can be stored for a considerable time at room temperature in relative darkness, for example in red light. Depending on their composition and their end use, for example for the production of coatings or films, they can be cured by the direct application of heat or in two stages by a combination of irradiation and heating. The curing temperature is generally 40°–200° C., preferably 80°–150° C. and particularly preferably 80°–110° C.

Two-stage polymerization (curing) is particularly preferred, by first activating the initiator of the formula I by irradiating the curable mixture and then curing, by the application of heat, the activated precursors thus obtained, the temperature of irradiation being below the temperatures used for the subsequent curing by heat. These activated precursors can normally be cured at temperatures which are considerably lower than would be required in the absence of component (C), preferably at temperatures between 80° and 110° C. This two-stage curing also makes it possible to control the polymerization in a particularly simple and advantageous manner. In addition, the activated precursors obtainable from the curable compositions according to the invention can, in general, be stored for a considerable time at room temperature, even in light, this applies particularly to mixtures which contain, as the component (A) a highly viscous or solid epoxy resin. This feature constitutes a further substantial advantage of two-stage curing and of these activated precursors.

The irradiation of the curable compositions for the purpose of preparing the activated precursors is advantageously effected by means of actinic light, preferably by means of radiation having a wavelength of 200 to 600 nm. Examples of suitable light sources are xenon lamps, argon lamps, tungsten lamps, carbon arcs, metal halide and metal arc lamps, such as low-pressure, medium-pressure and high-pressure mercury vapour lamps, or even lasers, such as argon ion or krypton ion lasers. Irradiation is preferably carried out by means of metal halide lamps or high-pressure mercury vapour lamps. The irradiation time depends on several factors, including, for example, the polymerizable organic material, the nature of the light source and the distance of the latter from the irradiated material. The irradiation time is preferably 1 to 60 seconds.

Heating the compositions which have been exposed to light can be carried out in conventional convection ovens. If short heating or reaction times are required, this can be effected by irradiation with, for example, IR radiation, IR lasers or micro-wave equipment.

The curable compositions according to the invention and the activated precursors obtainable therefrom are suitable, for example, for the production of surface coatings on a variety of substrates or as adhesives.

Examples of suitable substrates are metals, such as iron, steel, cadmium, zinc and preferably aluminium and copper, semi-conductors, such as silicon, germanium or GaAs, ceramics, glass, plastics, such as thermoplastics, paper or wood and metal-clad laminates.

The cured products are distinguished by good surface adhesion and high flexural strength. In the case of adhesive bonds it is possible to achieve a combination of high tensile shear strength with high roller-peel strength, so that the compositions can be employed as structural adhesives.

The invention also relates, therefore, to the cured products, which can be obtained from the compositions defined above, by direct curing with heat or by curing by means of a combined treatment with actinic radiation and heat.

The invention also relates to the use of curable compositions for the purposes mentioned above.

The following Examples illustrate the invention.

(A) Preparation of the carboxyl-terminated polyesters General procedure: The diol and the dicarboxylic acid components according to the following Table are heated at 180° C. for 6 hours and their condensation is then completed by applying a vacuum of 200 mbar.* The amounts of the components employed and the properties of the polyesters prepared are to be found in the following Table:

180.00 g of liquid bisphenol A epoxy resin (epoxide content 5.25–5.40 equivalents/kg, viscosity 10–12,000 mPa.s/25° C.)

120.00 g of solid bisphenol A epoxy resin (epoxide content 2.15–2.22 equivalents/kg, viscosity 160°–190 mPa.s/25° C.; 40% solution in butylcarbitol $[C_4H_9O(C_2H_4)_2H]$).

3.00 g γ-glycidyloxypropyltrimethoxysilane (Silane A-187 made by UC Corporation)

3.00 g of fluorinated alkylalkoxylate (Fluorad FC 171 made by 3M Corporation)

3.75 g ($\eta^6$-cumene) ($\eta^5$-cyclopentadienyl) Fe(II) hexafluoroantimonate 0.75 g of 2-isopropylthioxanthone.

These components are homogenized in a PE bottle impermeable to light for no more than 10 minutes by means of a dissolver at a speed of 10,000 rpm up to a maximum temperature of 70° C.

The appropriate amounts of the relevant polyester are added to this stock formulation and the mixture is homogenized again for 3–5 minutes in the dissolver.

The composition of the formulations can be seen from the Table below.

*Polyester I: 2 hours at 180° C.;
Polyesters II–VIII: 0.5 hour at 210° C.;
Polyester IX: 2 hours at 210° C.;
Polyesters X–XII: 1 hour at 210° C.

| Polyester No. | Synthesis Components[1] (g) | Relative viscosity/ °C., mPas | Acid number, mg of KOH/g | $M_n$ | $M_w/M_n$ |
|---|---|---|---|---|---|
| I | Poly-THF-1000[2] (650)<br>Maleic anhydride (130) | 40,920/25 | 30.5 | 2780 | 2.8 |
| II | Poly-THF-1000[2] (500)<br>Neopentyl glycol (52)<br>Maleic anhydride (130) | 30,720/25 | 44.0 | 4456 | 8.9 |
| III | Polycaprolactone[3] (415)<br>Maleic anhydride (65.1) | 17,920/25 | 29.2 | 3820 | 2.4 |
| IV | Poly-THF-1000[2] (500)<br>Cyclohexanedimethanol (72)<br>Maleic anhydride (130) | 250,800/25 | 34.7 | 4590 | 3.5 |
| V | Sebacic acid (242)<br>1,6-Hexanediol (141.6)<br>Neopentylglycol (62.4)<br>Maleic anhydride (78.4) | 4080/40 | 76.3 | 2290 | 2.3 |
| VI | Adipic acid (362)<br>1,6-Hexanediol (354)<br>Maleic anhydride (73.5) | 880/80 | 48.3 | 5110 | 1.6 |
| VII | Poly-THF-1000[2] (500)<br>Neopentyl glycol (52)<br>Fumaric acid (154) | 55,040/25 | 69.9 | 4300 | 2.5 |
| VIII | Poly-THF-1000[2] (500)<br>Neopentyl glycol (52)<br>Maleic anhydride (98)<br>Pripol ® 1017[4] (200) | 65,280/25 | 34.7 | 4170 | 2.5 |
| IX | Poly-THF-1000[2] (500)<br>Neopentyl glycol (104)<br>Sebacic acid (404) | 8320/25 | 60.5 | 2940 | 2.5 |
| X | Poly-THF-650[2] (650)<br>Succinic acid (157) | 4500/40 | 32.2 | 5250 | 1.9 |
| XI | Poly-THF-650[2] (650)<br>Phthalic anhydride (196.6) | 13,400/40 | 13.6 | 4770 | 2.6 |
| XII | Neopentyl glycol (104.1)<br>1,6-Hexanediol (118)<br>Sebacic acid (505) | 3800/40 | 87.2 | 2160 | 2.3 |

[1]All the polyesters are stabilized with 0.3 g of di-tert-butylcresol.
[2]The number given corresponds to the number average of the molecular weight.
[3]Niax PCP 210; an OH-terminated polycaprolactone of molecular weight 210.
[4]A mixture of dimerized and trimerized fatty acid.

(B) Preparation and testing of adhesive formulations
A stock formulation of an adhesive having the following formulation is prepared:

TEST OF TENSILE SHEAR STRENGTH

The tensile shear strength of aluminium adhesive joints is determined by applying the above adhesives manually by means of a 100 μm spiral doctor blade to the ends of two Anticorodal-110 test strips measuring 150×25×1.5 mm which had previously been roughened and degreased. The adhesive layer is activated by irradiation in a Minicure apparatus, using a high-pressure mercury vapour lamp of 80 watts/cm at a distance of 6–7 cm. The transport speed is 5 m/minute, which corresponds to an exposure time of 4.2 seconds. After the irradiation the two test strips are joined together (adhesive against adhesive) in an aluminium mounting in such a way that an adhesive surface of 25×12.5 mm is formed. Curing is carried out between two heating plates each at 100 +/− 2° C. and under a pressure of 0.7 N/mm² for 10 minutes. After this time the mounting is removed from the heating plates and cooled for 15 minutes at room temperature. The tensile shear strength (as specified in DIN 53,283) until the test specimen breaks is then measured by means of a tensile testing machine (Tensometer). The tensile shear values indicated in the Table below are in each case the average of 3 adhesive joints.

TEST OF ROLLER-PEEL STRENGTH

The roller-peel strength of aluminium adhesive joints is determined by the following method.

A test strip made of Avional-150 of dimensions 25×250×0.5 mm and a test strip of dimensions 25×250×2.0 mm are each etched in a chromic acid/sulfuric acid bath of the following composition:
Concentrated sulfuric acid (specific gravity 1.82) 7.55 l
Chromic acid ($CrO_3$) 2.5 kg
or Sodium dichromate ($Na_2Cr_2O_7+H_2$) 3.75 kg
Water approx. 40 l The parts to be joined are immersed for approx. 30 minutes in this etching bath, warmed to approx. 60°–65° C., and are subsequently rinsed under running, cold, clear water and then under warm water (50 to not more than 65° C.) and are dried in air or in an oven at not more than 65° C.).

A film is applied manually by means of a 60 μm spiral doctor blade to the test strips treated in this way, in each case to 1 side of the test strip. The subsequent exposure to light of the adhesive films is carried out as described in the test of tensile shear strength.

After exposure the two test strips are joined together in an aluminium template in such a way that an adhesive surface of 25×200 mm is formed. Curing is carried out between 2 heating plates each at 100 +/− 2° C. and under a pressure of 0.3 N/mm² for 10 minutes. After this time the mounting is removed from the heating plates and the roller-peel test specified in DIN 53,289 is carried out after the samples have been stored at room temperature for at least 24 hours. The values indicated in the following table are in each case the average of 3 adhesive joints.

TABLE

| Example No. | Composition and testing of adhesive formulations | | |
|---|---|---|---|
| | Polyester No. (% by weight) | Tensile shear strength (N/mm²) | Roller-peel strength (N/mm) |
| 1 | I (10) | 14.0 | 0.6 |
| 2 | I (15) | 14.8 | 2.0 |
| 3 | I (20) | 15.9 | 4.5 |
| 4 | I (25) | 12.9 | 5.0 |
| 5 | I (30) | 9.6 | 5.6 |
| 6 | II (10) | 12.7 | —[1] |
| 7 | II (20) | 14.9 | 3.5 |
| 8 | III (10) | 15.2 | —[1] |
| 9 | III (20) | 17.6 | 3.8 |
| 10 | IV (10) | 17.1 | —[1] |
| 11 | IV (20) | 14.1 | 3.7 |
| 12 | VI (10) | 12.6 | —[1] |
| 13 | VI (20) | 13.9 | 3.9 |
| 14 | V (10) | 12.2 | —[1] |
| 15 | V (20) | 13.6 | 2.9 |
| 16 | VII (10) | 10.4 | —[1] |
| 17 | VII (20) | 15.8 | 2.3 |
| 18 | VIII (10) | 3.7 | —[1] |
| 19 | VIII (20) | 4.1 | 0.9 |
| 20 | IX (10) | 16.4 | —[1] |
| 21 | IX (20) | 13.6 | 4.2 |
| 22 | X (10) | 14.3 | —[1] |
| 23 | X (20) | 11.4 | 2.4 |
| 24 | XI (10) | 5.2 | —[1] |
| 25 | XI (20) | 19.2 | 4.8 |
| 26 | XII (10) | 8.9 | —[1] |
| 27 | XII (20) | 10.4 | 2.5 |

[1]not determined.

EXAMPLES 28–30: Tests on adhesive formulations

A stock formulation of an adhesive is prepared in accordance with the following formulation:
47.00 g liquid bisphenol A epoxy resin (epoxide content: 5.25–5.40 equivalents/kg; viscosity 10–12,000 mPa.s/25° C.),
15.00 g of solid bisphenol A epoxy resin (epoxide content: 2.15–2.22 equivalents/kg; viscosity 160–190 mPa.s/25° C.; 40% solution in butylcarbitol),
15.00 g of cycloaliphatic epoxy resin (epoxide content: 7.00–7.63 equivalents/kg; viscosity 350–450 mPa.s/25° C.),
1.00 g of γ-glycidyloxytrimethoxysilane (Silane A made by UC Corporation),
1.00 g of fluorinated alkylalkoxylate (Fluorad FC 171 made by 3M Corporation),
0.25 g of isopropylthioxanthone and
20.00 g of polyester I.

The photoinitiator used is ($\eta^6$-cumene) ($\eta^5$-cyclopentadienyl) Fe(II) trifluoromethanesulfonate.

The preparation of the adhesive formulations and the measurement of tensile shear strength is carried out as described in Examples 1–27. The curing of the samples which have been exposed to light is, however, carried out in this case at 140° or 150° C. The results are to be found in the following Table.

| Example No. | Photoinitiator (% by weight) | Curing at (°C.) | Tensile shear strength (N/mm²) |
|---|---|---|---|
| 28 | [(Cumene)Fe (Cpd)] $CF_3SO_3$ (2.0) | 150 140 | 17.0 9.5 |
| 29 | [(Cumene)Fe (Cpd)] $CF_3SO_3$ (3.0) | 150 140 | 18.7 13.1 |
| 30 | [(Cumene)Fe (Cpd)] $CF_3SO_3$ (4.0) | 150 140 | 19.8 13.9 |

What is claimed is:
1. A composition containing
(A) An epoxy resin having on average at least two 1,2-epoxy groups per molecule or a mixture of these epoxy resins,

(B) a compound of formula I or a mixture of these compounds

in which a and b independently of one another are 1 or 2, $R^1$ is a pi-arene, $R^2$ is a pi-arene or a cyclopentadienyl anion, $X^-$ is $[LQm]^-$ or an anion of a partially fluorinated or perfluorinated aliphatic or aromatic sulfonic acid, L is B, P, As or Sb, Q is fluorine or fluorine in combination with hydroxyl groups, and m corresponds to the valence of L increased by one, and (C) a flexible polyester which is terminated by, on average, at least two carboxyl groups and which is derived from an aliphatic or cycloaliphatic polyol or a mixture of such polyols and from an aliphatic, cycloaliphatic or aromatic polycarboxylic acid or a mixture of such polycarboxylic acids.

2. A composition according to claim 1, wherein component (A) is a polyglycidyl ether based on phenols.

3. A composition according to claim 1, wherein component (A) is a combination of liquid diglycidyl ethers based on bisphenol together with solid diglycidyl ethers based on bisphenol or together with solid polyglycidyl ethers based on phenolformaldehyde novolaks or cresol-formaldehyde novolaks.

4. A composition according to claim 3, wherein component (A) is a combination of liquid and solid bisphenol A diglycidyl ethers.

5. A composition according to claim 1, containing, as the component (B), a compound of the formula I in which $R^1$ is a benzene or naphthalene radical which is monosubstituted or disubstituted by alkyl or alkoxy, $R^2$ is a cyclopentadienyl anion and $X^\ominus$ is $SbF_6^\ominus$.

6. A composition according to claim 1, wherein component (C) is a compound of the formula II

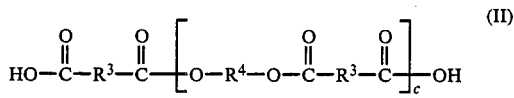

in which $R^3$ is a radical of an aliphatic, cycloaliphatic or aromatic dicarboxylic acid after the carboxyl groups have been removed, $R^4$ is a radical of a divalent, aliphatic or cycloaliphatic alcohol after the hydroxyl groups have been removed and c is an integer from 1 to 50.

7. A composition according to claim 6, wherein at least some of the radicals $R^4$ are divalent radicals of a polyalkylene ether.

8. A cured product formed from a composition according to claim 1, obtainable by direct curing by heat or by curing by means of combined treatment with actinic radiation and heat.

* * * * *